United States Patent
Haas et al.

(10) Patent No.: US 12,521,817 B2
(45) Date of Patent: Jan. 13, 2026

(54) DETERMINATION OF CONTOUR FIDELITY FOR A LASER CUTTING MACHINE

(71) Applicant: BYSTRONIC LASER AG, Niederönz (CH)

(72) Inventors: Titus Haas, Brittnau (CH); Andreas Luedi, Burgdorf (CH); Stefan Wittwer, Herzogenbuchsee (CH)

(73) Assignee: BYSTRONIC LASER AG, Niederönz (CH)

( * ) Notice: Subject to any disclaimer, the term of this patent is extended or adjusted under 35 U.S.C. 154(b) by 0 days.

(21) Appl. No.: 18/558,707

(22) PCT Filed: Aug. 18, 2022

(86) PCT No.: PCT/EP2022/073045
§ 371 (c)(1),
(2) Date: Nov. 2, 2023

(87) PCT Pub. No.: WO2023/030902
PCT Pub. Date: Mar. 9, 2023

(65) Prior Publication Data
US 2024/0246173 A1 Jul. 25, 2024

(30) Foreign Application Priority Data
Sep. 3, 2021 (EP) .................................... 21194737

(51) Int. Cl.
*B23K 26/08* (2014.01)
(52) U.S. Cl.
CPC ............................... *B23K 26/0876* (2013.01)
(58) Field of Classification Search
CPC .................................................. B23K 26/0876
(Continued)

(56) References Cited

U.S. PATENT DOCUMENTS

| 5,777,880 A * | 7/1998 | Bowen | G05B 19/4083 |
| | | | 700/134 |
| 2017/0014945 A1* | 1/2017 | Fraser | B23K 26/359 |

FOREIGN PATENT DOCUMENTS

| DE | 102011003717 A1 | 8/2012 |
| DE | 102011103282 | 12/2012 |

(Continued)

OTHER PUBLICATIONS

WO2007005639 (Year: 2007).*
(Continued)

*Primary Examiner* — Ibrahime A Abraham
*Assistant Examiner* — Joseph W Iskra
(74) *Attorney, Agent, or Firm* — Workman Nydegger

(57) ABSTRACT

In one aspect, the present invention relates to a contour checking device for calculating path deviations from a target path of a cutting head of a laser machine tool. The contour checking device comprises a reference texture interface for reading a reference texture along the target path, which is defined in particular for cutting a contour, a controller, which is intended for controlling the laser machine tool in such a way that the cutting head traverses the target path; at least one camera, wherein the controller for controlling the at least one camera is intended for continuously capturing overlapping frames of the reference texture along the traversed path; a processor, which is intended for executing an image processing algorithm for reconstructing the trajectory traversed by the cutting head from the captured overlapping frames of the reference texture; and wherein the processor is intended for calculating deviations between the reconstruction of the path traversed by the cutting head and the target path. The contour checking device also comprises an output interface, which is intended for outputting the calculated deviations.

10 Claims, 11 Drawing Sheets

(58) Field of Classification Search
USPC .................................................... 219/121.79
See application file for complete search history.

(56) References Cited

FOREIGN PATENT DOCUMENTS

| | | |
|---|---|---|
| DE | 102018217940 | 4/2020 |
| EP | 1314510 A1 | 5/2003 |
| KR | 20180040305 A | 4/2018 |
| WO | 94/23886 A1 | 10/1994 |
| WO | WO1994023886 * | 10/1994 |

OTHER PUBLICATIONS

International Search Report and Written Opinion, mailed Nov. 16, 2022, from PCT/EP2022/073045, 10 pages.
International Preliminary Report on Patentability, mailed Jun. 5, 2023, from PCT/EP2022/073045, 18 pages.
Zirn and Weikert, "Modeling and Simulation of Highly Dynamic Manufacturing Systems", Chapters 2 and 5, Aug. 31, 2005, Springer Berlin, Heidelberg.
Haas (Set Point Optimisation for Machine Tools, https://doi.org/10.3929/ethz-b-000271470), May 2018.
Lanz et al. , "Efficient Static and Dynamic Modelling of Machine Structures with Large Linear Motions", International Journal of Automation Technology, vol. 12, No. 5, pp. 622-630, Aug. 7, 2018.

* cited by examiner

DETERMINATION OF CONTOUR FIDELITY FOR A LASER CUTTING MACHINE

The invention is in the field of laser cutting technology and relates in particular to determining contour fidelity.

The demands on laser cutting machines in terms of productivity and accuracy are constantly increasing. The aim is to be able to cut a workpiece/part as quickly and precisely as possible. However, there are limits to these two goals, or the goals "as quickly as possible" and "as precisely as possible" are even opposing. For example, the faster you want to cut around a corner, the geometrically less precise this corner cut will be, since the actual cutting contour will deviate from the target contour because of overshooting due to inertia of the machine, axle, cutting bridge and cutting head, and resilience (mass inertia). The exact position of the laser beam typically also cannot be measured, because internal encoder measurement systems on the drive axles only measure indirectly and cannot take into account the moments of inertia and/or flexibility described above.

Other reasons for the deviations between the actual and target cutting contours are vibrations of the gantry system or of the robot to which the machining head is attached, or vibrations of the workpiece or the workpiece support, which lead to overshooting when cutting along the cutting contour. Other reasons for path deviations can also be friction, static friction, backlash, incorrect compensation values, etc.

In order for the cut part to be within a desired tolerance (path deviation/contour error), the dynamic limits of a machine (especially in the region of small radii and corners) are usually restricted, which leads to reduced productivity.

Various approaches to reducing the conflict of aims between "path accuracy" and "cutting speed" are known.

DE 10 2018 217 940 A1 proposes a method with a camera and reflection pattern to increase contour accuracy. A camera is moved along the target path of a part contour, which captures the reflection pattern of the workpiece surface in overlapping subregions in a spatially resolved manner and uses this to measure deviations in the path travelled from the target path. In particular, the position increments along the part contour are determined by the optimum of a similarity function, which is also described in DE 10 2005 022 095 A1.

EP 131 4510 A1 proposes an imaging method to detect deviations from a three-dimensional target welding line. The deviation is used for ongoing adjustment (teaching) of the path travelled.

DE 10 2011 103 282 A1 is also known, which uses a moving camera to capture the machining region of a high-energy laser beam on a workpiece surface. The captured images along the target path are compared with a target image that represents the optimal machining welding process.

The analogous problem for the laser cutting process is solved by DE 10 2011 003 717 A1. In particular, the workpiece edges created during laser cutting are captured with a camera and evaluated for machining quality.

Various approaches for model-based estimation of contour errors are known. There are different types of models to characterise the kinematic properties of machine tools. The models are based on differential equations, such as those by Zirn and Weikert (Modellbildung und Simulation hochdynamischer Fertigungssysteme, https://www.springer.com/de/book/9783540258179). A two-mass model was used by Haas (Set Point Optimisation for Machine Tools, https://doi.org/10.3929/ethz-b-000271470) where the position of the laser beam was described using a 4th order differential equation system.

Machine models for position estimation can also be created by model reductions of finite element models, FEM; see, for example, (N. Lanz, D. Spescha, S. Weikert and K. Wegener, "Efficient Static and Dynamic Modelling of Machine Structures with Large Linear Motions", International Journal of Automation Technology, vol. 12, pp. 622-630, 2018).

Model-based contour error estimations/compensations are only as good as the model quality allows. There is usually a compromise to be found between model quality and model complexity. Non-linear effects can rarely be mapped or cannot be mapped at all, which is why it is necessary to measure the effective contour error. In addition, most models for contour error estimation do not take into account the environmental conditions, such as the laser cutting head in use, in particular its weight distribution, the nozzle, the actuators, etc.

Proceeding from this prior art, the object addressed by the invention is that of determining contour fidelity for a cutting task. In particular, the determination of contour fidelity for correction or compensation should already take place before cutting in order to reduce incorrectly cut parts. Overall, the quality of the cutting result should be improved.

This object is achieved by the appended patent claims, in particular by a computer-implemented method, a use of said method for calculating compensation, a contour checking device and a computer program.

According to a first aspect, this object is achieved by a computer-implemented method for calculating path deviations from a (defined or specified) target path of a cutting head of a laser machine tool. The method can comprise the following method steps:

(1) providing a reference texture running on or along the target path;

(2) providing first control commands for traversing the target path with the cutting head and second control commands for continuously capturing overlapping frames of the reference texture on or along the traversed path by means of at least one camera;

(3) reconstructing the path traversed by the cutting head from the captured overlapping frames of the reference texture by means of an image processing algorithm;

(4) calculating deviations between the reconstruction of the path traversed by the cutting head and the target path. The calculated (contour) deviations are preferably output on an output interface.

A number of advantages are associated with this solution. It is thus possible to determine the contour accuracy and contour fidelity according to the current environmental conditions, such as according to the drive mechanism of the laser cutting head, the acceleration and speed of the drive mechanism, the weight or the weight distribution of the laser cutting head, the cutting nozzle used, the contour or the cutting plan (for example, should fine contours be cut precisely or should rough contours be cut with high tolerances). Furthermore, the contour fidelity can be determined before the cutting and thus without possibly faulty cutting. Furthermore, the solution is very accurate.

The terms used in this document are explained below in more detail.

The reference texture is preferably applied or overlaid directly on or along the target path (e.g., parallel thereto) which the laser cutting head is to traverse. The reference texture must be applied or overlaid in such a way that it can be detected from the field of view (FOV) of the camera. The reference texture is preferably applied over the target path in such a way that an overlapping region is created. The reference texture is usually larger than the target path, which is specified as a line or curve. The reference texture can have a size, in particular a height, which is in a range between 10 μm and 10 mm, the size or height being defined here as perpendicular to a departure direction of the cutting head. The lateral length or width, i.e., in the departure direction, is variable and depends on the cutting plan or the contour. The reference texture is used for local referencing between the image space and the workpiece space and is used as a basis for the image processing algorithm, such as an image stitching algorithm, of the captured images. The reference texture can preferably be designed as a series of numbers, in particular as a continuous series of numbers and/or as a sequence of letters of an alphabet, in particular a continuous sequence of letters, or as a non-periodic, non-linear and non-repetitive pattern. The reference texture can be, for example, a metal sheet or a flat object having an outer contour corresponding to the target path. The reference texture can be a pattern that was previously applied, e.g., engraved, to a metal sheet and/or a natural texture/surface microstructure along the target path (determined when traversing slowly).

The camera can preferably be arranged coaxially or centrally with respect to the laser beam optical unit and can be used to detect the process zone. A plurality of cameras can also be configured. The camera can be coupled to an illumination source. The camera can also be attached with an offset, rather than coaxially; then the offset must be known and is taken into account in the reconstruction of the path actually traversed by the cutting head.

The target path corresponds to the contour to be cut. The target path can be read from a cutting plan. The target path corresponds to the desired geometry defined in the cutting plan.

The deviation between an actual position (measured or reconstructed) and positions of the target path corresponds to the contour error.

The image processing algorithm can be an image stitching algorithm that is applied to overlapping regions and is thus modified and/or a feature mapping algorithm that is based on feature mapping of frames with overlapping regions along or on a contour, which are compared with a 'virtual' overall image to determine the deviation. The image stitching algorithm can, for example, only be used in relevant regions where there is a risk of infidelity, and is then used for "high-resolution detection" of the deviation.

The image stitching algorithm known in the prior art must be modified to be used for the contour deviation calculation, in particular to be robust with respect to spurious pixel value patterns in the captured overlapping images. In addition to stationary image components, low contrasts in the overlapping region are another prominent example, which can completely or partially interrupt the contours between features and the surrounding surface and lead to poor results for the application (laser cutting). This leads to a reduction in the dynamic pixel value information that can be evaluated, and the integrated difference norms are adjusted. This is avoided according to the invention. Another fault lies in periodic or quasi-periodic image components (e.g., grinding or rolling marks), which can result in undesirable minima of the integrated difference norm in the case of aliasing. Further examples of spurious pixel value patterns can be reflections from optical elements, contamination of the optical path (protective glass, cutting focusing lens, camera lens), surface structure of the metal sheet (roughness, reflectivity), illumination current intensity or other parameters.

In a first embodiment of the invention, the modification of the known image stitching algorithm can relate to the reduction of the number of overlapping areas by using the axis increments. From this, sub-areas, in particular sub-areas of variable size, can be determined in which the sought minimum of the integrated difference norms is expected. With the method described, low values of the integrated difference norms are typically obtained at the edges of the possible overlapping areas. This circumstance can complicate the search for their minimum. Therefore, in a second embodiment of the invention, it is proposed that this be compensated by weighting the integrated difference norms depending on their position.

According to a preferred embodiment of the invention, the reference texture can be selected in a configuration phase from a predefined set of patterns, which is preferably stored in a memory, and/or read via a human-machine interface, HMI, for example. The reference texture is preferably determined automatically and presented as a suggestion on the HMI. The user then has the option of accepting the suggestion or modifying it. Additionally or alternatively, buttons can be provided on the HMI, via which the user can, so to speak, configure the reference texture themselves. This has the advantage that the contour fidelity determination method can also be executed if, for example, the data connection to the memory with the stored reference textures is temporarily interrupted.

In a preferred embodiment of the invention, the reference texture is configurable and can be configured in particular according to the nozzle used (nozzle width), the mechanical actuators, the cutting plan or the contour defined therein and/or cutting parameters (e.g., focal position).

In a further preferred embodiment of the invention, the reference texture is provided by engraving the reference texture on the workpiece (macrostructure) by means of the cutting head of the machining laser in a separate engraving run. Alternatively or additionally, the reference texture can be provided by placing a flat object provided with the reference texture below the cutting head of the machining laser and above the workpiece (e.g., stationary, 'non-slipping') (macrostructure). The flat object can be a reference material, in particular reference metal sheet, for example. No special metal sheet is required. For example, the workpiece that is to be machined next can be used straight away. Alternatively or additionally, the surface structure of the workpiece to be cut can also be used as a reference texture (microstructure).

In a further advantageous embodiment of the invention, the target path is traversed in step (2) without activating the laser, i.e., in a calibration run and without the laser being activated and without cutting.

In a further advantageous embodiment of the invention, the target path is traversed in step (2) with at least one configurable calibration speed. Additionally and/or alternatively, the acceleration and/or jerk can be configured using corresponding buttons on the HMI. In particular, the calibration run parameters mentioned (speed, acceleration, jerk, etc.) can be configured specifically for a contour point. This has the advantage that the calibration run can be specifically configured in contour regions that have a high risk of a contour deviation (e.g., at corners or tight radii). The calibration run parameters can also be calculated automatically using algorithms and displayed on the HMI as a suggestion for the user to confirm or reject.

In a further advantageous embodiment of the invention, at least one contour from a cutting plan is determined as the target path, with the target path being traversed at least twice in step (2), namely:
1. firstly with at least one calibration speed in at least one first calibration run and
2. secondly at a productive speed in a second calibration run, with the calibration speed being lower, in particular 80% to 99% lower, than the productive speed.

It is also within the scope of the invention to carry out more than two calibration runs and/or calibration runs with other calibration run parameters that differ in each case.

In a further advantageous embodiment of the invention, to reconstruct the path traversed by the cutting head by means of the image processing algorithm and in particular with the image stitching algorithm, encoder measurement values of machine axes involved can be used, in addition to the captured frames, to make the image processing algorithm more robust and/or faster. In this context, it should be expressly emphasised that the encoder values only serve to accelerate the algorithmic image processing and in particular the image stitching or to make it more robust. The encoder values help here in that the image stitching only searches for the best image overlap in a plausible/reasonable image region. It is therefore also not necessary for the encoder values to be provided with a very high degree of accuracy.

In a further advantageous embodiment of the invention, the second control commands can trigger the activation or switching-on of an illumination source, so that, for example, an illumination source, in particular an illumination laser, is switched on synchronously with the capturing of the frames. This serves to optimise the image capture and illumination of the process zone. The illumination source can be located in or on the camera or at another position, and act directly or indirectly (by reflection) on the process zone.

In a further advantageous embodiment of the invention, the target path can be traversed in step (2) several times and/or with different advancement and/or with different acceleration and/or with different calibration run parameters. The productive speed is the speed at which productive cutting is to be carried out later. The speed (productive speed and calibration speed) is currently specified by the cutting parameters. At least the calibration speed can be adjusted by the operator of the machine. However, the calibration speed can also come from or be read from an alternative data source (cloud, cutting plan, external memory, etc.).

In a further advantageous embodiment of the invention, the image processing algorithm can be in the form of an image stitching algorithm and can reconstruct N−1 displacement vectors (path increments) from a sequence of N frames, with N being a natural number greater than 2. The image stitching algorithm integrates the difference norms over all overlaps in the search region of successive frames. Two successive frames (also abbreviated as images) are shifted against each other in the search region. As a result, different overlap variants are realised until the minimum is found. In this case, the search region is advantageously the assumed vicinity of the sought minimum of the pixel value deviation in the overlapping region. Terms and methods are described, for example, in "Computer Vision", L. Shapiro and G. Stockman, Prentice Hall, p. 251.

The algorithm implemented here differs from the published image stitching algorithm in that it also works for the lowest possible contrasts of the workpiece surface. To this end, several modifications are made to the published image stitching algorithm.

Firstly, for the benefit of calculation speed, the correlation operations described were not used and the just as common and faster integrated difference norm of all pixel values in overlaps was used instead.

In a further advantageous embodiment of the invention, the image stitching algorithm can secondly apply a local weighting and/or approximation function to the integrated difference norms. Thirdly, the image of the difference norms can be weighted to reduce deviations (particularly at the edges of the search region) from an approximation function. The approximation function can be used to determine the minimum of optimal image overlap with sub-pixel accuracy.

In a further advantageous embodiment of the invention, a deviation model can be calculated from the calculated deviations. Additionally or alternatively, a deviation model can be calculated from the calculated deviations and captured position coordinates of the cutting head on a cutting table (captured workspace).

The calculation of path deviations for contour error determination can basically be carried out on different selected regions on the workpiece, which is positioned on a work table. This makes it possible, for example, to select the critical regions for contour error determination, such as those with many narrow radii or complex trajectory requirements. This can be carried out, for example, by comparing with the material to be cut and/or with specifications from the cutting plan, for example taking into account the magnitude of the acceleration or the curvature. This is first because deviations from the target increments can also occur along a straight line. Although these affect the contour accuracy less, they can lead to local irregularities in the machining process.

According to a further aspect, the object is achieved by using the method described above for calculating a contour error-corrected cutting path. For example, the contour error-corrected cutting path can be carried out by calculating an offset for the speed or for other cutting parameters with respect to a point on the contour, wherein the offset is calculated from the determined deviations. Basically, the speed is reduced where high contour deviations were detected during the calibration run. In the prior art, models are mentioned which can also be used to take into account captured path deviations and thus specify target paths that are more targeted for the axle drives, so that there are consequently smaller path deviations. The present invention, on the other hand, solves the stated problem more precisely and specifically and without complex model calculations in that path deviations, in particular at corners, which have arisen due to overshoots, are compensated for by adjusting the acceleration or braking of the cutting head, e.g., by initiating earlier braking towards a corner.

The solution to the problem has been described on the basis of the computer-implemented method. Features, advantages, or alternative embodiments mentioned in this way can also be applied to the other claimed subjects and vice versa. In other words, the present claims (which are directed, for example, to a device, a system or to a computer program product) can also be further developed with the features described and/or claimed in connection with the method, and vice versa. The corresponding functional features of the method are thereby formed by corresponding present modules, in particular by hardware modules or microprocessor modules, of the system or of the product, and vice versa. In general, in computer science, a software implementation and a corresponding hardware implementation (e.g., as an embedded system) are equivalent. Therefore, for example, a method step for "storing" data can be performed with a memory unit and corresponding instructions for writing data to the memory. In order to avoid redundancy, the device is therefore not described again explicitly, although it can also be used in the alternative embodiments described in relation to the method. The preferred embodiments of the invention described above in connection with the method are therefore not explicitly repeated for the device.

In a further aspect, the invention relates to a contour checking device for calculating path deviations from a target path of a cutting head of a laser machine tool, comprising:
- a reference texture interface for reading in a reference texture on or along the target path, which is defined in particular for cutting a contour;
- a controller, which is intended for controlling the laser machine tool in such a way that the cutting head traverses the target path;
- at least one camera, wherein the controller for controlling the at least one camera is intended for the continuous capture of overlapping frames of the reference texture on or along the traversed path;
- a processor, which is intended for executing an image processing algorithm for reconstructing the path traversed by the cutting head from the captured overlapping frames of the reference texture; and
- wherein the processor is intended for calculating deviations between the reconstruction of the path traversed by the cutting head and the target path; and wherein the contour correction device further comprises:
- an output interface, which is intended for outputting the calculated deviations.

In a further aspect, the invention relates to a computer program, comprising commands, which, when the computer program is executed by a computer, cause the latter to execute the method as described above. It is also possible that the computer program is stored on a computer-readable medium.

In the following detailed description of the figures, non-limiting exemplary embodiments with the features and further advantages thereof will be discussed with reference to the drawings.

DETAILED DESCRIPTION OF THE INVENTION

The solution approaches presented here are used to monitor contour fidelity and in particular before carrying out a laser cutting process.

Figure 1:
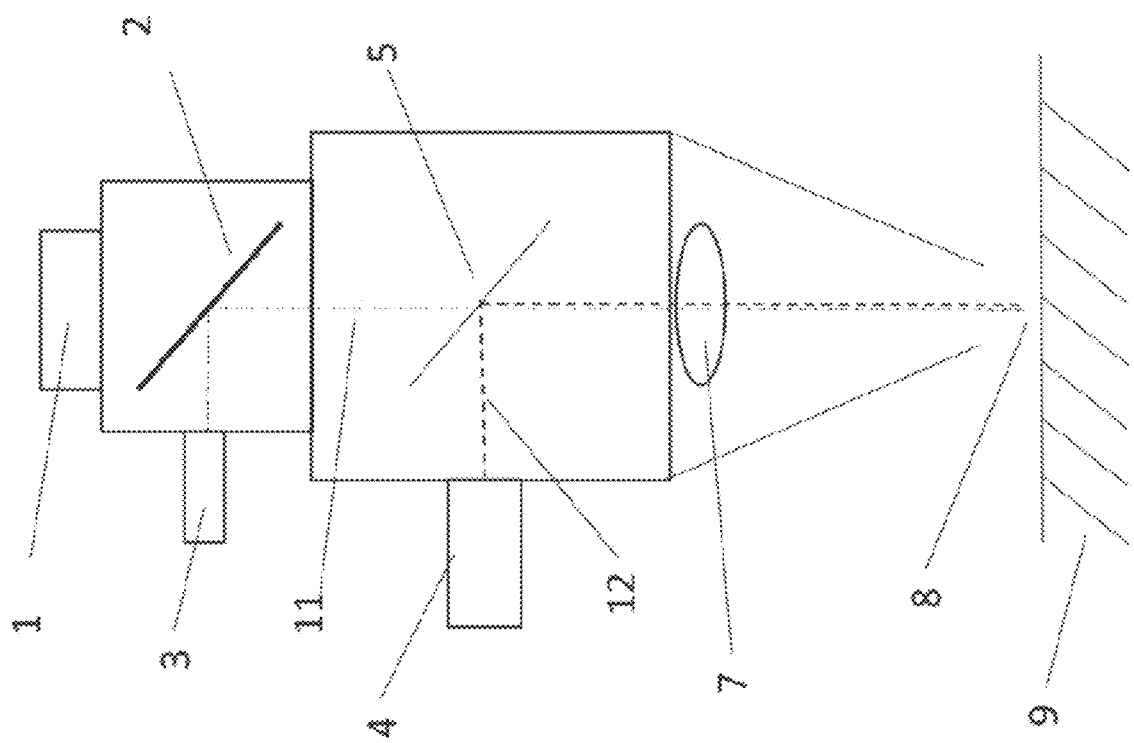
FIG. 1 shows a schematic view of a cutting head for machining a workpiece.

FIG. 1 shows a cutting head 10 of a laser machine tool, which has an adapted camera K, having a field of view (FoV) which looks at the process, ideally coaxially with respect to the machining laser beam. The process or cutting zone is constantly tracked by this arrangement of the camera K, which makes it possible for any contour deviations to be detected. To further optimise process monitoring, a coaxial process illumination 3 is adapted, which illuminates the process location 8 on the workpiece 9. Optical deflection elements 5 are arranged in the beam path 12 of the laser beam. A laser source 4 can focus the laser beam onto the workpiece 9 via suitable optical elements, such as optical lenses 7.

In order to determine possible path deviations, it is proposed with the cutting head 10 described above to determine the path deviations (in particular at corners) in a calibration process, to calculate corresponding correction variables and then to apply these for and during productive machining of parts, which reduces path deviations and/or reduces the time per part with the path deviation remaining the same.

Figure 2:
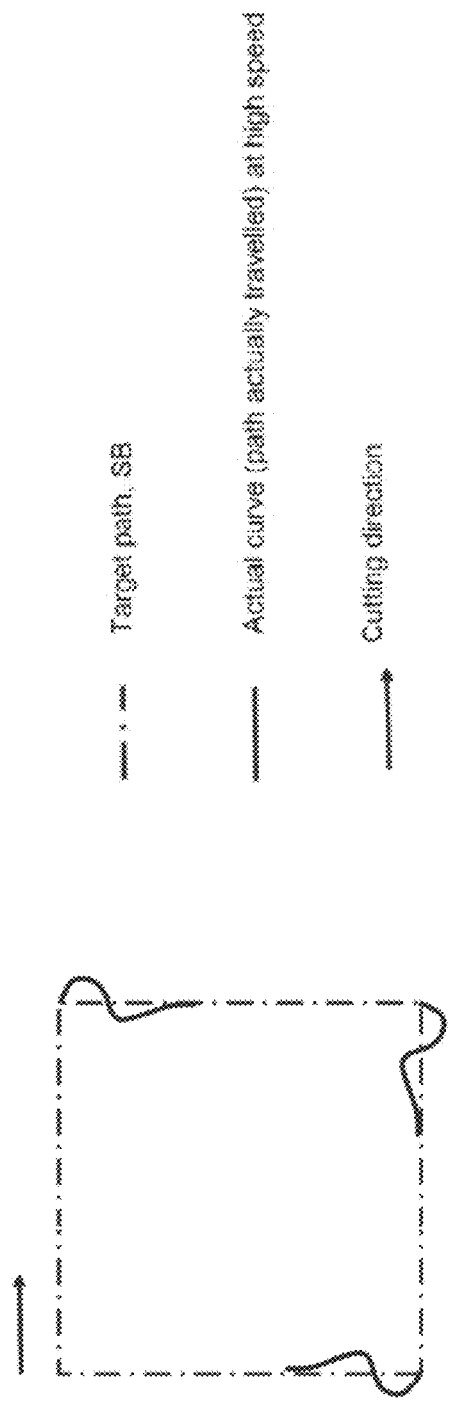
FIG. 2 shows an exemplary and simplified representation of a target path and a path actually traversed by the cutting head.

As shown schematically in FIG. 2, contour deviations occur in particular at corners. The target path is shown in FIG. 2 as a dash-dot line, and the cutting direction is marked with the arrow. Depending on the speed (advancement of the cutting head), the path actually travelled (shown with a solid line in FIG. 2) deviates from the target path SB. In particular at high speeds and accelerations, the actual path actually traversed by the cutting head will deviate from the target path. At the corners, the actual path will typically overshoot the target path.

The path deviations to be expected can depend on the dynamics. The higher the axle accelerations and speeds selected, the greater the deviations to be expected.

To avoid this, automatically calculated adjustments are made on the basis of calculated contour deviations.

Figure 3:
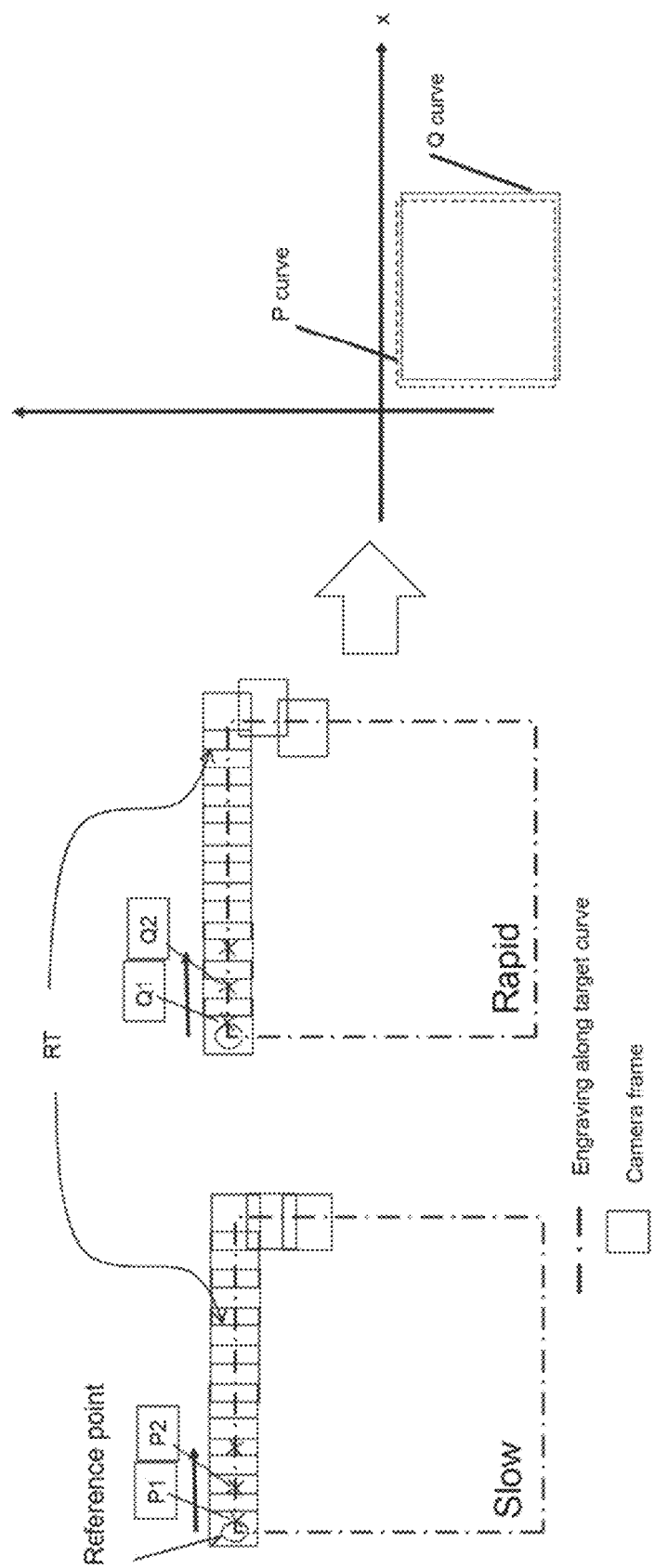
FIG. 3 shows the target path and the captured overlapping frames of a reference texture.

FIG. 3 schematically shows a reference texture RT that can be engraved along the target path SB. The frames captured by the camera K overlap and are shown in FIG. 3 with the image centres P, which are used as reference points.

The target path SB can be traversed in one or more calibration runs, for example with a slow calibration speed (P curve, left image in FIG. 3) and with a fast calibration speed (Q curve, shown on the right in FIG. 3). The result is different traversed paths (P curve and Q curve).

FIG. 3 shows how speed-dependent actual paths can be determined by means of the captured camera frames. As mentioned above, an example of an actual path is shown for a slow run (P curve) and for a faster run (Q curve). If primarily dynamically induced causes are significant for the path deviations, then in a preferred embodiment of the invention the P curve can also be used as the target path.

The path deviations that are detected with the procedure proposed here can include dynamically induced or statically induced contour deviations. If only one calibration run is made, it cannot be determined how/where from the path deviations are induced. However, a separation of dynamically and statically induced deviations can be derived if several calibration runs are carried out at different speeds. Deviations that are independent of the speed are referred to as static, and the others as dynamic. Statically induced deviations are, for example, hysteresis effects and/or backlash in axle drives. According to an advantageous development, it is possible to filter stationary image components from complete overlapping of two or more consecutive images. In principle, the type of stationary image components (e.g., nozzle edge, contamination, etc.) can be deduced from the filtered pattern.

In a preferred embodiment of the invention, how the calibration run is carried out can be configurable (i.e., with which calibration run parameters, e.g., how often, at what speed etc.). A selection button can be provided on the user interface, HMI. It is also possible to provide automatic determination of the calibration run parameters (e.g., calibration speed) and/or the position of the contour deviation check in the workspace.

It is fundamentally important that adjacent frames overlap (sufficiently) and that the engraving of the reference texture RT is clearly visible. Because this ensures that the frames can be put together along the actual path by means of image stitching and the exact actual path can thus be reconstructed. The engraving is basically only for facilitating the image stitching. The image stitching algorithm can calculate the path traversed from the sequence of frames and in particular from the dynamic image components. In principle, static and dynamic image components are taken into account in image stitching. Examples of moving (stationary or static) image components are the nozzle, nozzle shadowing effects, the cutting front, imaging errors or contamination of the optical unit. Reflections change the angle of incidence over the image sequence and are therefore not stationary (although the reflective surface structures are stationary). However, correct displacement vectors are only obtained from the dynamic structures. Measures must therefore be taken in the image processing algorithm to reduce the influence of stationary image components (e.g., by filtering stationary/static or similar image components in two or more successive images).

Specifically, in the example in FIG. 3, the actual path can be described by determining, for example, the centre of each frame. This results in the points P1, P2, . . . .

The point curve Pn can be fitted to the target path SB, for example using an algorithm based on the least squares method (no dynamically induced deviations between the target path and actual path are to be expected on the straight lines). The deviations (in particular at the corners) of the paths correspond to the dynamically induced contour error.

If path inaccuracies are primarily expected due to the machine dynamics, then as an alternative to the target path SB from the machine controller, the reconstruction of the traversed path from a slow run (P1, P2, . . . Pn) can also be used as the target path SB. In this case, the points Pn can be determined relative to a reference point, in which case the reference point can be an easily identifiable starting point of the engraving or reference texture RT. The same is done with the video recording when the engraving is traversed quickly, which leads to the actual Q. The curves P and Q can then be represented in an x-y coordinate system. The deviations between the actual and target path become obvious. The advantage of the method in which the slow calibration run is used as the target path SB compared to the alternative method (use of the machine target path) is that no machine target paths have to be used. On the other hand, it is disadvantageous that several actual paths with different dynamics have to be recorded.

Figure 4:
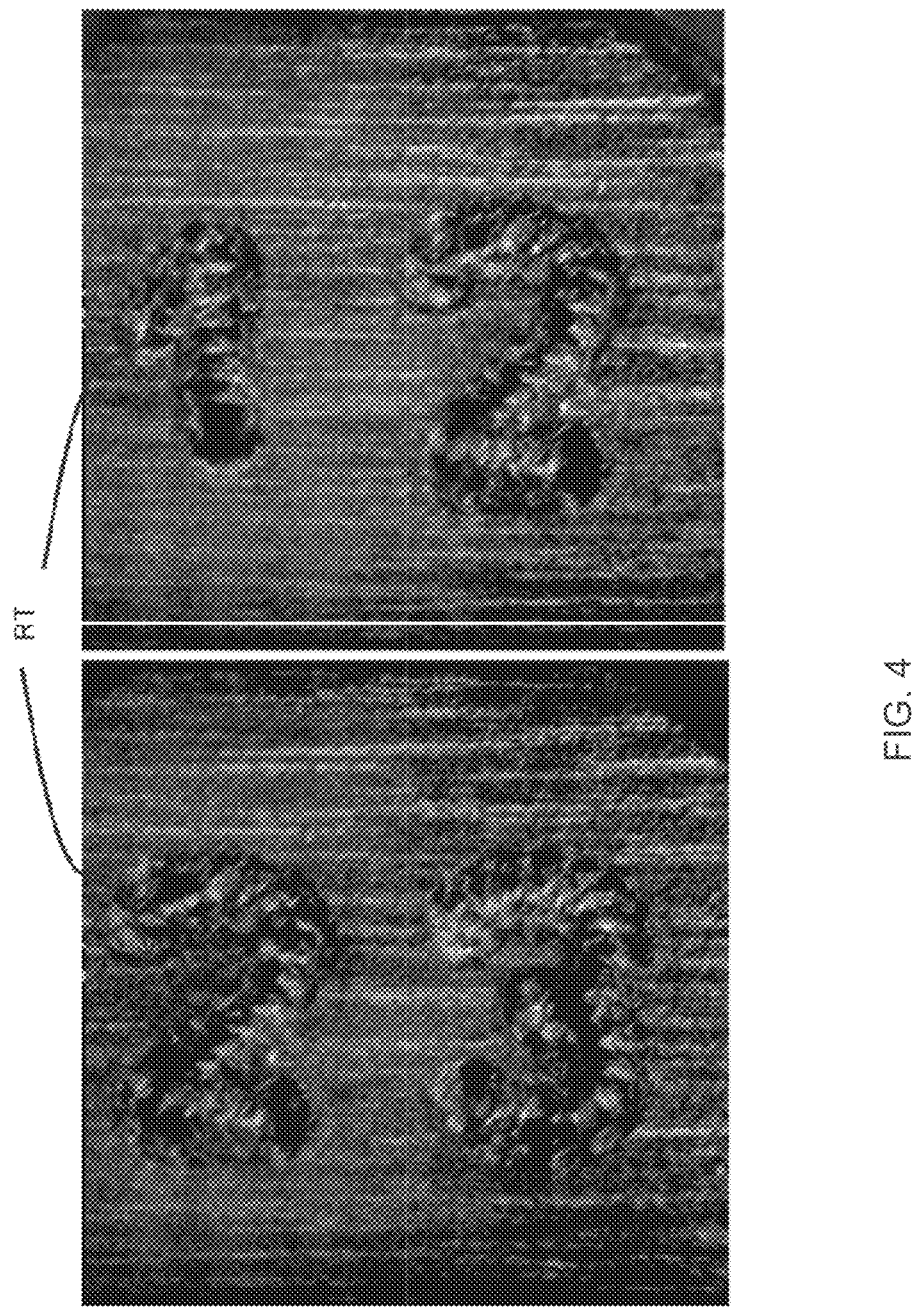
FIG. 4 shows an example of a sequence of captured overlapping frames.

FIG. 4 shows an example of adjacent frames with visible engraving or reference texture RT (numbers here). The fact that the two adjacent images can be stitched well using the engraved numbers is obvious when the cutting head has been instructed using the first control commands to traverse the target path SB and the camera K has been instructed using the second control commands to capture the images along the reference texture RT in the process. Tests have shown that in order to run the image stitching algorithm, there must be at least an overlap of at least 5%, preferably over 10% and more preferably over 20% between the successive or adjacent frames (two successive images with a frame rate of 400 fps (fps, frames per second). In a preferred embodiment of the invention, the overlapping region can be configured in advance via a corresponding input mask on a user interface. In particular, it is possible to compare the overlap region with the available hardware resources (processor performance).

Figure 5:
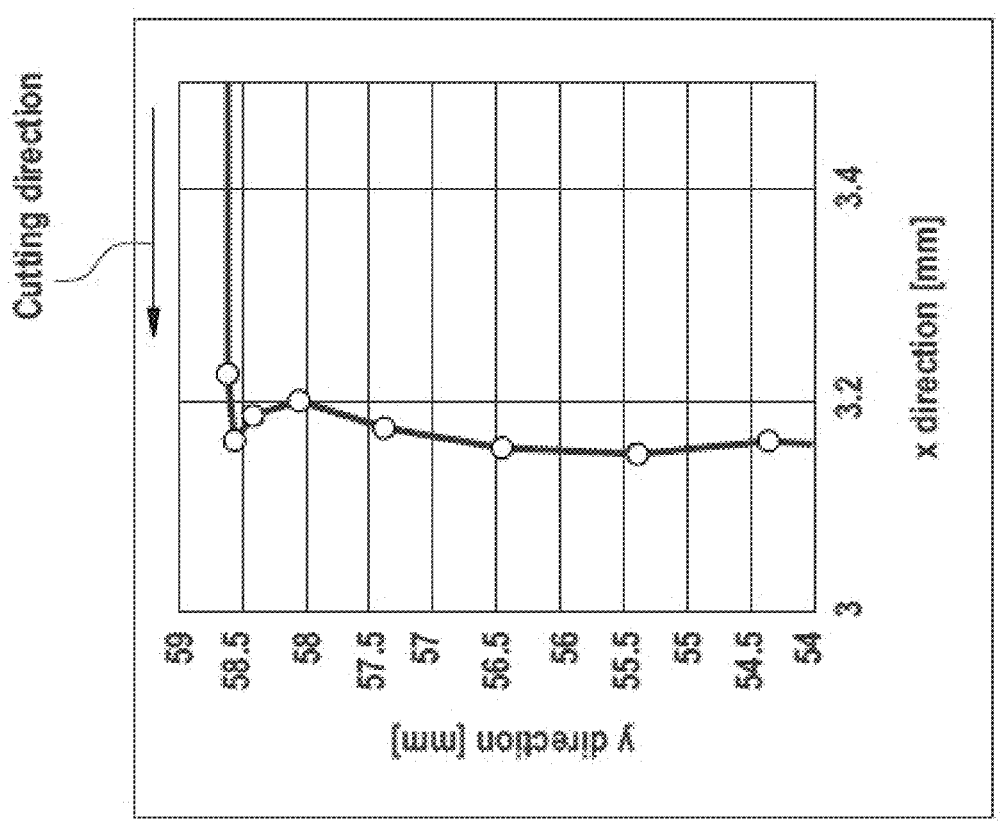
FIG. 5 shows an overshoot, in particular at a corner, by way of example.

FIG. 5 shows an example of contour deviations in the form of "corner overshoots". The arrow pointing to the left in FIG. 5 indicates the cutting direction and the path plotted over the X and Y axes is the reconstructed path (actually) traversed by the cutting head. The path deviations can be seen at and after the corner. FIG. 5 shows the reconstruction of the (actual) path actually traversed by the cutting head, the target path (not shown) representing a right-angled corner. The deviations of the actual path from a right-angled target path, in particular the overshoots at the corner, are obvious.

Figure 6:
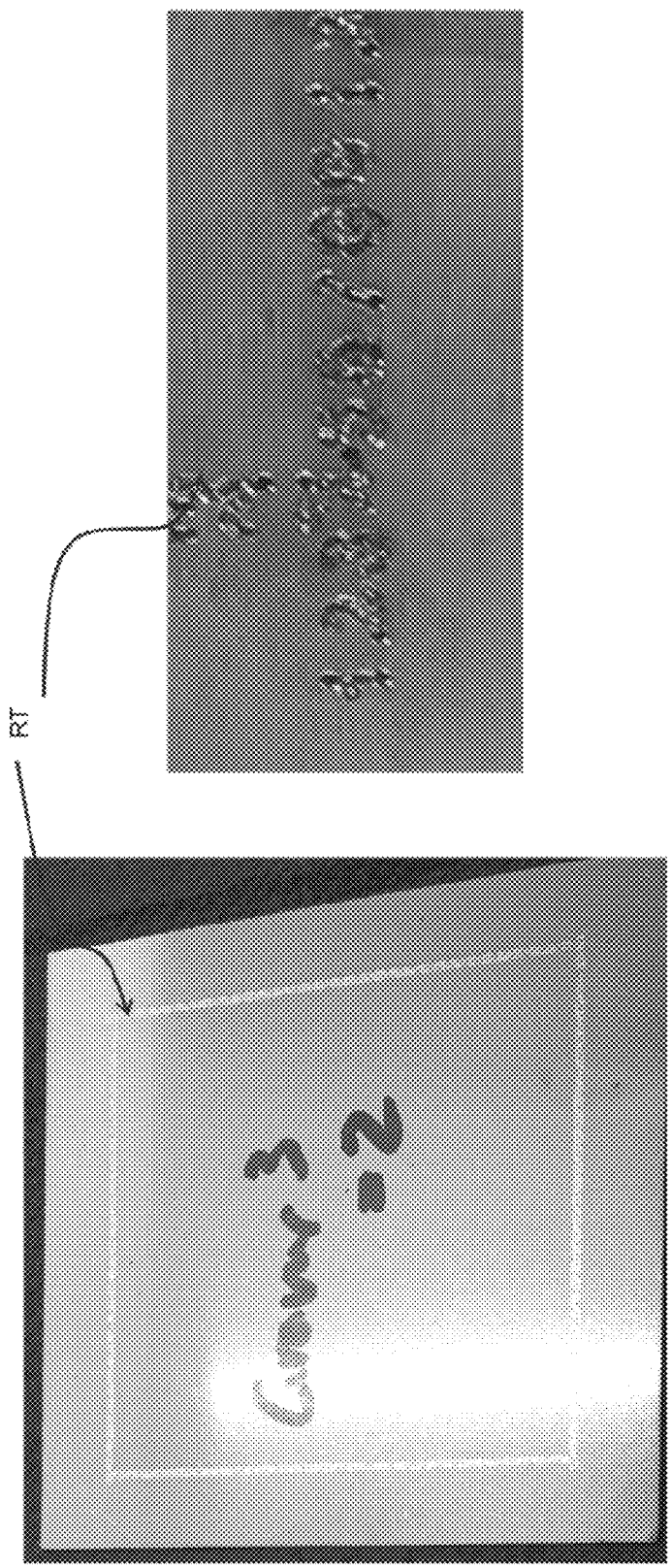
FIG. 6 shows an example of a reference texture engraved on a workpiece.

FIG. 6 shows an example of a reference texture RT in the form of a series of numbers.

Figure 7:
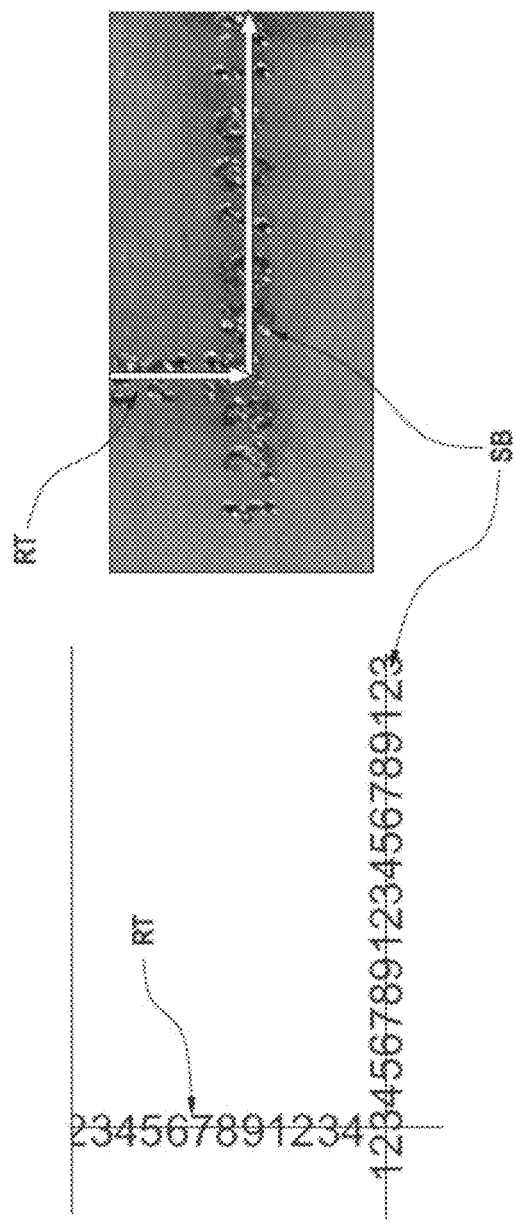
FIG. 7 shows another example of a reference texture.

FIG. 7 shows the reference texture RT on the left-hand side as a machine plan and in the right image in a form actually engraved into the metal sheet. The solid lines in the left image and right image each represent the target path SB. It can be seen here that the reference texture RT is applied on or centrally above the target path SB. Alternatively, however, the reference texture RT can also be applied next to the target path or provided in some other way (not shown). The field of view of the camera K must then be adjusted and matched to the position of the reference texture RT in such a way that it can capture the reference texture RT completely or partially during the calibration run in order to be able to provide spatial resolution. Combinations of the above alternatives are also possible. For example, in the case of a rectangular target path SB, the reference texture RT on the first long leg can lie directly on the target path, and on the adjoining short leg over the target path, and on the further adjoining second long leg not on the target path SB but on the inside next to same, and in the further adjacent second short leg outside of the target path. The distance from the target path SB can be predetermined or configurable. It is important that the field of view (FoV) of the camera is selected in such a way that the reference texture RT can be at least partially captured. The image stitching can also be carried out robustly using the alternatives mentioned.

According to a preferred embodiment of the invention, a first method 1 can be used to calculate the contour deviations, which is explained in more detail below with reference to FIG. 8.

In step 1.1, a target path is determined. The geometry that lies over a reference texture is understood here as the target path. The path to which the reference texture is to be applied can also be defined here if this is not to supposed to match the target path (from the cutting plan).

In step 1.2, the reference texture (e.g., a series of numbers or letters) is defined. This is preferably done automatically and can be calculated as a function of the cutting parameters (nozzle width, etc.). The automatically calculated suggestion for the reference texture can be output on a human-machine interface, HMI, for the purpose of confirmation or rejection (with subsequent recalculation).

In step 1.3, the predefined or calculated reference texture can be applied and/or engraved on a metal sheet with the machining laser. For example, the metal sheet which is to be machined next can be used immediately.

In step 1.4, the target path is traversed in a calibration run (without cutting), with the camera K continuously recording overlapping frames. For the purpose of optimised camera recordings, the illumination laser is also switched on synchronously with the image recordings.

In step 1.5, on the basis of the image capture (step 1.4 during the calibration run), the contour errors or the deviations from the target path are determined for the reconstruction of the actual path actually traversed by the cutting head via an image processing algorithm and in particular via image stitching. Contour deviations can be determined using various measures and/or according to different specifications.

In a first variant, the error can be determined by comparing a slowly travelled path and the correspondingly stitched actual path with a rapidly travelled path and the correspondingly stitched (reconstructed) actual path.

In a second variant, the error or the path deviations can be determined by using the stitched actual path (i.e., reconstruction of the path traversed by the cutting head) and a machine target path (subtraction).

In step 1.6, cutting can then be carried out with compensation for the contour errors.

Figure 8:
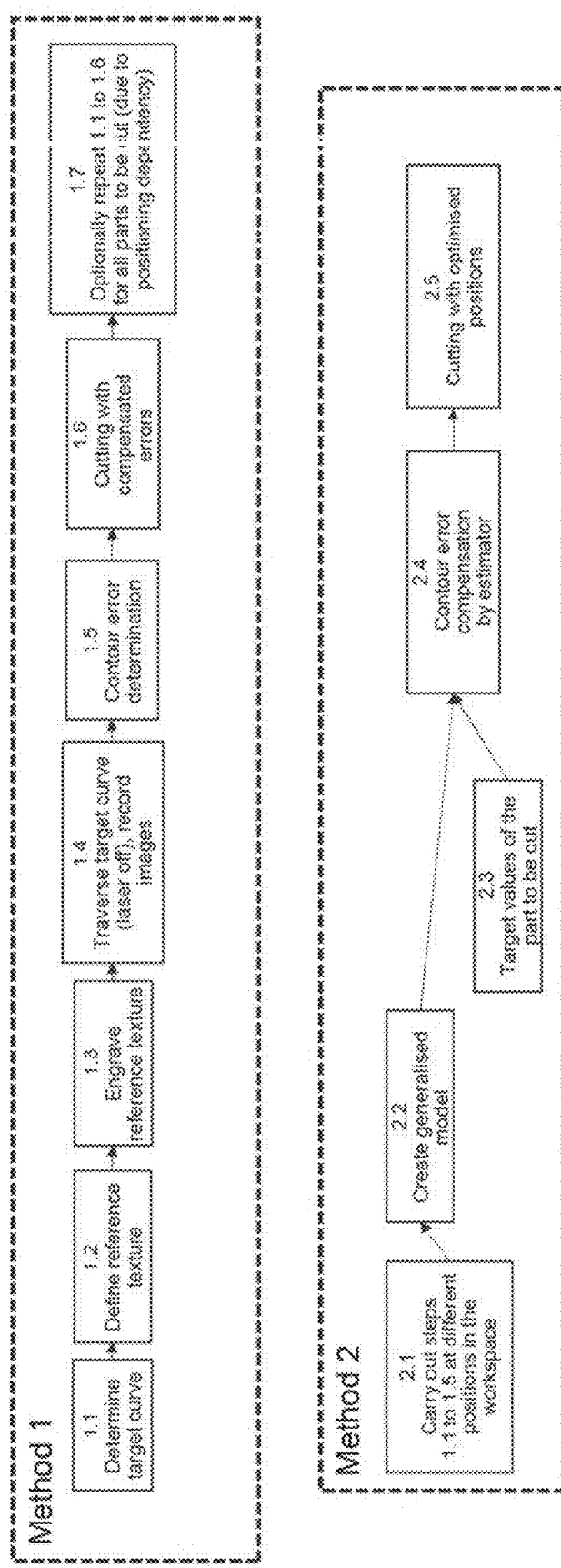
FIG. 8 shows the method for calculating path deviations using two alternative methods.

Optionally, the steps mentioned above can be carried out at predefinable specific positions in the workspace and/or for all or selected workpieces and/or parts to be cut in order to reflect and take into account the position dependency of the contour error determination (represented in FIG. 8 with step 6). If the target path SB and the reference texture RT are at a position in the laser workspace that is off centre (for example at one end of the worktable, such that certain axes are fully extended), then different contour deviations occur than if the position is central and is in the middle of the workspace. It is therefore possible for the calibration runs to be carried out at different positions in the workspace. Certain positions can be automatically preconfigured for this, which the user can then accept or reject.

The method 2 shown in FIG. 8 relates to dynamics-dependent contour inaccuracies. As expected, dynamics-dependent contour inaccuracies depend on the position on the cutting table. If the contour accuracy or contour deviations are determined at various positions on the cutting table (i.e., in the workspace) using the solution approach described here, a generalised model for contour error reduction across the entire workspace (workspace-dependent machine model) can be created. With the help of such a model, the contour error compensation can then be calculated and applied on the basis of the target values of the parts to be cut.

The procedure of method 2 is analogous to that of method 1 in that steps 1.1 to 4 are carried out, but with the amendment that steps 1.1 to 4 are carried out at different positions in the workspace. This allows a generalised model to be created to reduce contour errors. Method 2 may comprise the following steps:

2.1 carrying out steps 1.1 to 1.5 at different positions in the workspace of the machine;
2.2 creating a generalised, workspace-dependent contour error model;
2.3 providing target values of the part to be cut—the target values can be taken in particular from the cutting plan and optimised by taking into account the calculated deviations (e.g., by reducing the speed at the corners);
2.4 calculating contour error compensation based on the target values and the generalised model;
2.5 cutting with optimised positions.

The generalised model created can be applied to any parts with any target paths and path dynamics. Contour error determination (with the step "providing a reference texture" or engraving, . . . and model creation) no longer has to be carried out for future parts to be cut. The amount of work is reduced considerably due to the model created.

The core of the image joining or image stitching algorithm is the comparison of the pixel value distribution of two or more digital images. Two successive frames are superimposed in such a way that all non-empty overlap variants are created. In each variant, the pixel values of the overlapping area are subtracted, the absolute value (norm) of the pixel value differences is calculated and totalled (integrated). The calculated integrated difference norms of all overlap variants result in a value field which is one less than twice the frame width (frame height). By definition, the absolute minimum in the value field of the integrated difference norms determines the overlap variant with the best correspondence. The vertical and horizontal pixel distance of the frame zero points of the best overlap variant are the components of the displacement vector sought.

The associated algorithm is described in detail in textbooks on computer vision (e.g., Computer Vision by L. Shapiro and G. Stockman, published by Prentice Hall). The description in DE102005022095A1 can be found specifically for the application of laser material processing.

Various influencing factors determine the quality of the measured displacement vector in terms of accuracy, repeatability and clarity. Even small pixel value influences can lead to significant measurement errors in the method of the prior art. The most common are low image contrast, stationary image components (shapes that remain the same over the image sequence), periodic surface structures (aliasing) and imaging errors.

According to the invention, a camera-based path measurement method is provided which is robust with respect to significant measurement errors. The method should be sufficiently precise to be able to distinguish measured deviations from target positions and target patterns from measurement errors. This is particularly critical because the deviations measured are usually in the range of a few microns to several tens of microns, which means on the one hand they are in the range of typical pixel sizes (resolution limit) and on the other hand are in the range of the desired manufacturing tolerances for cutting samples.

This is achieved with a multiple-referenced surface measurement method with a camera K, which measures the displacement vectors of overlapping and successive images in an image sequence by optimally combining them.

In the first referencing (providing the reference texture RT), the reference texture RT is engraved on the workpiece surface as a non-linear, non-periodic and non-repetitive pattern (local measurement reference, calibrated reference texture RT). This has the advantage that the dynamic (moving) image components are distinguished more clearly from undesired image components, even in the case of high handling dynamics and small overlapping image regions, and significant measurement errors are reduced. Instead of an engraved pattern, any other contour pattern to scale could be used, for example stencils, or black-and-white printed or electronically displayed drawings. Instead of engraving, other methods can be used to provide the reference texture RT (e.g., applying a surface-structured metal sheet).

In a second referencing (calibration run, without laser cutting), the camera K travelling with the cutting head records the non-linear and non-periodic and non-repetitive contour pattern (temporal measurement reference). This creates an image sequence in which the successive frames overlap in a subregion. The spatial distance between the successive frames is given by the displacement vectors. The measurement accuracy of the displacement vector increases with a larger overlapping region between subsequent images. This can be achieved by a reference run at a very low speed. This also minimises deviations from the planned target path SB. From this, the metric pixel size can be precisely scaled to a few percent by means of linear regression of the target increment and the displacement vectors. A spread (standard deviation) of the metric pixel size is also calculated from the regression.

In an—optional—third referencing (further calibration run), the displacement vectors are measured at high path accelerations, scaled in length units, cumulatively totalled to measured path positions and finally compared with the nominal positions of the target path SB. This results in the deviation of the actually traversed and measured path (from the reconstruction of the path traversed by the cutting head) from the target path SB. With the spread of the pixel size known from the second referencing, it can be determined whether the measured deviation is within the measuring accuracy. It goes without saying that the parameterisation of the image sequence recording must be identical for the second and third referencing (comparability).

After the three referencing steps, the described image stitching method according to the prior art will deliver fewer significant measurement errors. However, generally too many incorrect overlaps still remain for practical use. This is because the absolute minimum of the integrated difference norms is not the desired one, or no clearly distinguished minimum can be found. The reasons for this lie in the quality of the image sequence examined. Any choice of a wrong optimum results in a significant measurement error.

Figure 9:
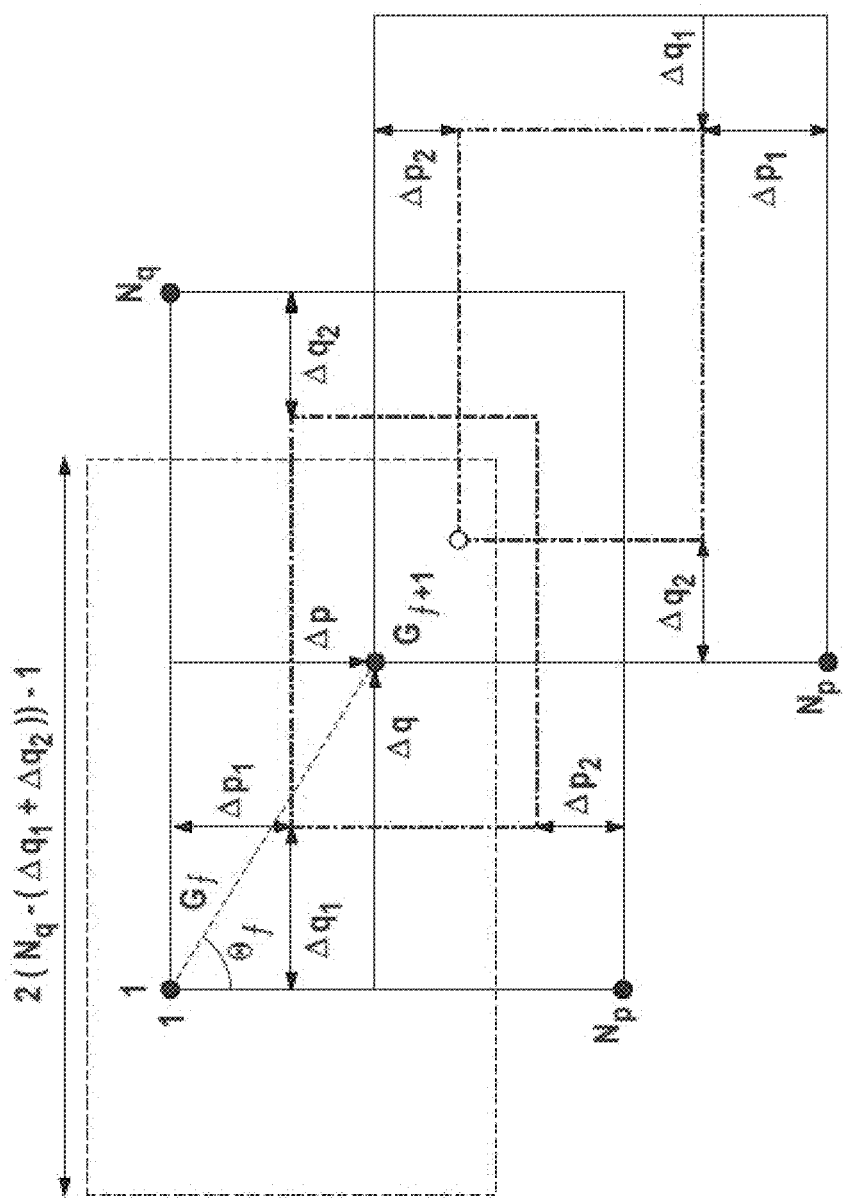
FIG. 9 shows a representation of the overlapping shift calculations using an image stitching algorithm.

Therefore, in addition to the referencing, a multi-stage procedure for finding the correct optimum is proposed in the present invention. This is explained in more detail below with reference to FIG. 9.

Instead of the integrated difference norms, a variant of the weighted mean is used for the comparison of the overlapping subregions in order to weight the adjacent pixels equally over the entire displacement region.

The displacement region is placed around the nominal axis positions of the target path SB and scaled as large as necessary. This considerably increases the probability that an optimum found is also the sought global optimum.

The optima found are distinguished via a relation function of the adjacent pixel values.

The variant of the weighted integrated difference norm is a function of the displacement vector (delta p, delta q)^T and is:

$$\Delta g_{f:\Delta p,\Delta q} = \frac{1}{w(N_p - \Delta p)w(N_q - \Delta q)} \sum_{p=p_0}^{p_1} \sum_{q=q_0}^{q_1} |g_{f+1:p+\Delta p,q+\Delta q} - g_{f:pq}|$$

The meaning of each variable is as follows:
g Unit-standardised pixel value
f Index of the frame
W Weighting function
delta p Horizontal displacement
delta q Vertical displacement
N_p Width of a frame
N_q Height of a frame The weighting function is used to amplify the integrated difference norms at the edge of the displacement region compared to those in the central region. If identity is chosen as the weighting function, the result is the arithmetic mean.

The summation limits are given with $$p = \begin{cases} p_0 = 1 + \Delta p_1 \ldots N_p - \Delta p_1 + \Delta p = p_1 & \Delta p \le 0 \\ p_0 = 1 + \Delta p_2 + \Delta p \ldots N_p - \Delta p_2 = p_1 & \Delta p > 0 \end{cases}$$

$$q = \begin{cases} q_0 = 1 + \Delta q_1 \ldots N_q - \Delta q_1 + \Delta q = q_1 & \Delta q \le 0 \\ q_0 = 1 + \Delta q_2 + \Delta q \ldots N_q - \Delta q_2 = q_1 & \Delta q > 0 \end{cases}$$

Here, Delta p1,2 and Delta q1,2 define the position and size of the displacement region. The Delta p and Delta q components of the displacement vector vary horizontally $$\Delta p = 1 - (N_p - 2\Delta p_1) \ldots 0 \ldots N_p - 2\Delta p_2 - 1$$

and vertically $$\Delta q = 1 - (N_q - 2\Delta q_1) \ldots 0 \ldots N_q - 2\Delta q_2 - 1$$

over the displacement range.

The relation function puts the pixel value of the found optimum in relation to the adjacent pixel values. In principle, any meaningful definition of the relation function can be used. However, the logical AND operation of the following two relational functions has proven to be particularly effective with regard to distinguishing the correct optimum:
  1. Within a vicinity radius, the optimum has the most pixels having a value greater than the pixel value at the centre.
  2. The sum of all pixel values within the vicinity radius reduced by the pixel value of the current optimum is greater than that of all other optimums found.

Figure 10:
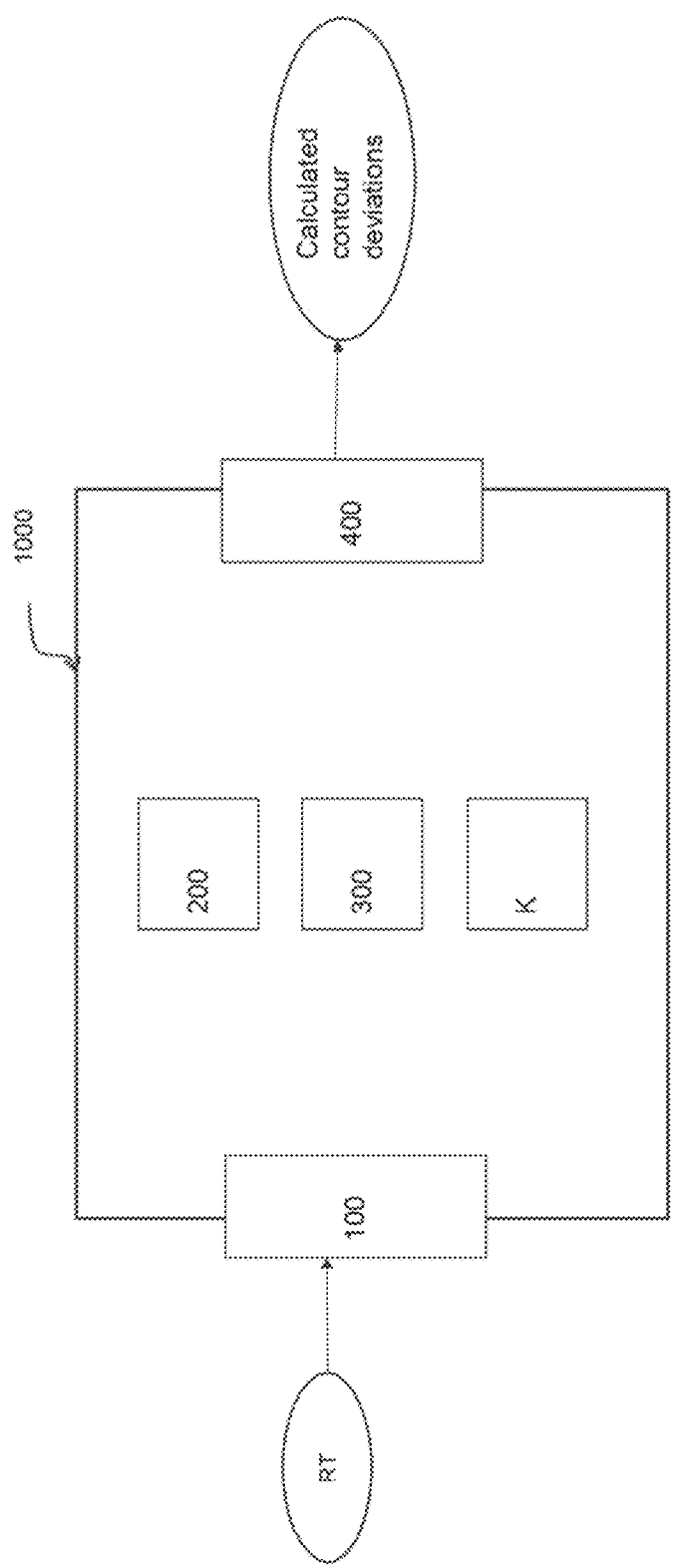
FIG. 10 shows an block diagram of a contour checking device according to a preferred embodiment of the invention.

FIG. 10 is a block diagram of a contour checking device 1000. The contour checking device 1000 comprises at least two interfaces: a reference texture interface 100 for reading a reference texture RT along the target path SB, which is defined in particular for cutting a contour according to the cutting plan, and an output interface 400, which is intended for outputting the calculated deviations.

The contour checking device 1000 also comprises a controller 200, which is intended for controlling the laser machine tool in such a way that the cutting head 10 traverses the target path SB as part of a calibration run.

The contour checking device 1000 also comprises at least one camera K, wherein the controller for controlling the at least one camera K is intended for the continuous capture of overlapping frames of the reference texture RT along the path traversed in the calibration run.

The contour checking device 1000 also comprises a processor 300, which is intended for executing an image processing algorithm for reconstructing the path traversed by the cutting head from the captured, overlapping frames of the reference texture RT. The processor 300 is configured to calculate deviations between the reconstruction of the path traversed by the cutting head and the target path SB.

Figure 11:
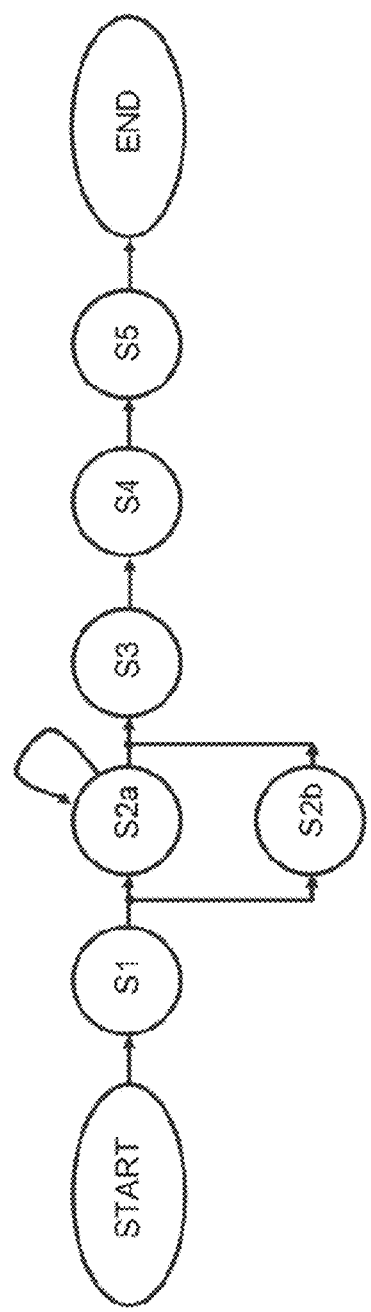
FIG. 11 shows a flow chart of the contour checking method according to a preferred embodiment of the invention.

FIG. 11 shows a flow chart according to a preferred embodiment of the invention. After the start of the method for calibrating the contour correction, the reference texture RT is provided in step S2 (e.g., engraving in the form of an engraving run). In step S2*a*, first control commands for traversing the target path (first calibration run) are provided and in step S2*b*, second control commands for controlling the camera K are provided. The image processing algorithm, in particular the image stitching algorithm, is executed in step S3. In step S4, the contour deviations are calculated based on the camera. In step S5, the calculated contour deviations are output as a result data set on an output interface 400. After that, the calibration process can end.

Obviously, in step S2*a* several calibration runs (without laser cutting), e.g., with different calibration run parameters (e.g., different speeds), can be carried out. This is indicated in FIG. 11 by the self-pointing arrow at step S2*a*.

In one development of the invention, it is possible to also transfer the calculated camera-based contour deviations to laser machine tools that do not have a camera by creating a machine model. The machine model can, for example, be stored centrally in a database to which a large number of laser machine tools have access via appropriate data connections. A laser machine tool that is not equipped with a camera can then access the machine model and, if necessary, make adjustments to the machine type, estimate contour deviations and take appropriate countermeasures for contour correction.

The method for camera-based contour error measurement can also be used to create an artificial neural network (ANN) for contour error estimation. The ANN can also have an improving effect on machine systems without a camera system. The continuous collection and storage of contour error measurement data and machine data can be used for updating ANNs and for widespread use of the ANNs for machine systems without a camera system.

In addition, the camera-based method for calculating contour deviations can be event-based (loading a new cutting plan or loading other workpieces, etc.) and/or automatically triggered on the machine according to a time pattern, e.g., periodically (e.g., monthly, biannually, . . . ). If the determined deviation becomes greater over the service life, then this indicates possible machine wear/drive wear/poor functioning of the machine. This development is captured and recorded. Maintenance can be proactively initiated from the captured data or the data can be used as part of predictive maintenance.

Finally, it should be noted that the description of the invention and the exemplary embodiments are not to be understood as limiting in terms of a particular physical realisation of the invention. All of the features explained and shown in connection with individual embodiments of the invention can be provided in different combinations in the subject matter according to the invention to simultaneously realise the advantageous effects thereof.

The scope of protection of the present invention is given by the claims and is not limited by the features illustrated in the description or shown in the figures.

It is particularly obvious to a person skilled in the art that the invention can be used not only for laser machine tools with a coaxial camera, but also for those that have a different camera arrangement and are suitable for capturing the reference texture RT during a calibration run. Furthermore, the components of the contour checking device can be realised or implemented in a distributed manner on a number of physical products. For example, the method can be carried out entirely on the laser machine tool, or resource-intensive calculations, such as the reconstruction of the (actual) path traversed by means of the image processing algorithm, can also be outsourced to a different hardware entity. For example, the captured frames and the first control commands could be outsourced to a central server that performs the calculation (reconstruction) and then only returns the calculated deviations to the laser machine tool.

The invention claimed is:

1. A method for calculating path deviations from a target path of a cutting head of a laser machine tool, the method comprising:
   providing a reference texture, wherein the reference texture is provided on a flat object placed below the cutting head and above a workpiece and/or the reference texture is engraved on the workpiece by means of a machining laser beam of the cutting head of the laser machine tool;
   providing the reference texture running along the target path;
   providing first control commands for traversing the target path with the cutting head and providing second control commands for continuously capturing overlapping frames of the reference texture on or along the traversed path by means of at least one camera, wherein the target path is traversed in step (2) without activating the laser;
   reconstructing the path traversed by the cutting head from the captured overlapping frames of the reference texture by means of an image processing algorithm;
   calculating deviations between the reconstruction of the path traversed by the cutting head and the target path, wherein for the reconstruction of the path traversed by the cutting head with the image processing algorithm, encoder measurement values of machine axes involved are used in addition to the captured frames in order to speed up and/or make the image processing algorithm more robust, the image processing algorithm including an image stitching algorithm,
   wherein the image stitching algorithm reconstructs N−1 displacement vectors from a sequence of N frames, wherein N is a natural number greater than 2.

2. The method according to claim 1, in which, in a configuration phase, the reference texture is selected and/or read from a specified set of patterns.

3. The method according to claim 1, wherein the target path is traversed in step (2) with at least one configurable calibration speed and/or a configurable acceleration in a calibration run.

4. The method according to claim 1, wherein at least one contour from a cutting plan is determined as the target path and wherein in step (2) the target path is traversed at least twice, namely: firstly with a calibration speed in a first calibration run and secondly with a productive speed in a second calibration run, wherein the calibration speed is lower, in particular 80% to 99% lower, than the productive speed.

5. The method according to claim 1, wherein an illumination source, in particular an illumination laser, is switched on synchronously with the capturing of the frames.

6. The method according to claim 1, wherein the target path is traversed in step (2) several times and/or with different calibration run parameters, in particular with different acceleration and/or different advancement.

7. The method according to claim 1, wherein a deviation model is calculated from the calculated deviations and/or wherein a deviation model is calculated from the calculated deviations and captured position coordinates of the cutting head on a cutting table.

8. A use of the method according to claim 1 for calculating a contour error-corrected cutting path.

9. A method for calculating path deviations from a target path of a cutting head of a laser machine tool, the method comprising:
- providing a reference texture, wherein the reference texture is provided on a flat object placed below the cutting head and above a workpiece and/or the reference texture is engraved on the workpiece by means of a machining laser beam of the cutting head of the laser machine tool;
- providing the reference texture running along the target path;
- providing first control commands for traversing the target path with the cutting head and providing second control commands for continuously capturing overlapping frames of the reference texture on or along the traversed path by means of at least one camera, wherein the target path is traversed in step (2) without activating the laser;
- reconstructing the path traversed by the cutting head from the captured overlapping frames of the reference texture by means of an image processing algorithm;
- calculating deviations between the reconstruction of the path traversed by the cutting head and the target path,
- wherein for the reconstruction of the path traversed by the cutting head with the image processing algorithm, encoder measurement values of machine axes involved are used in addition to the captured frames in order to speed up and/or make the image processing algorithm more robust, the image processing algorithm including an image stitching algorithm,
- wherein the image stitching algorithm integrates difference norms over all overlaps in a search region of successive frames.

10. A method for calculating path deviations from a target path of a cutting head of a laser machine tool, the method comprising:
- providing a reference texture, wherein the reference texture is provided on a flat object placed below the cutting head and above a workpiece and/or the reference texture is engraved on the workpiece by means of a machining laser beam of the cutting head of the laser machine tool;
- providing the reference texture running along the target path;
- providing first control commands for traversing the target path with the cutting head and providing second control commands for continuously capturing overlapping frames of the reference texture on or along the traversed path by means of at least one camera, wherein the target path is traversed in step (2) without activating the laser;
- reconstructing the path traversed by the cutting head from the captured overlapping frames of the reference texture by means of an image processing algorithm;
- calculating deviations between the reconstruction of the path traversed by the cutting head and the target path,
- wherein for the reconstruction of the path traversed by the cutting head with the image processing algorithm, encoder measurement values of machine axes involved are used in addition to the captured frames in order to speed up and/or make the image processing algorithm more robust, the image processing algorithm including an image stitching algorithm,
- wherein the image stitching algorithm applies a local weighting and/or approximation function to integrated difference norms.

* * * * *